United States Patent [19]

Chou

[11] Patent Number: 5,456,448
[45] Date of Patent: Oct. 10, 1995

[54] TOUCH BUTTON CONTROLLED WATER STOP

[76] Inventor: Hsiao-Tsung Chou, 9F-1, No. 25, Sec. 1, Nan-Ching E. Road, Taipei, Taiwan

[21] Appl. No.: 329,180

[22] Filed: Oct. 26, 1994

[51] Int. Cl.⁶ .................................................. F16K 31/44
[52] U.S. Cl. .................. 251/230; 74/110; 74/567; 74/575; 251/229; 251/263; 251/284; 251/322; 251/323
[58] Field of Search ............................. 74/548, 553, 554, 74/110, 567, 575; 251/96, 230, 251, 263, 320, 321, 322, 323, 229, 284

[56] References Cited

U.S. PATENT DOCUMENTS

| | | | |
|---|---|---|---|
| 3,001,551 | 9/1961 | Wyser | 251/96 |
| 3,193,243 | 7/1965 | Billington et al. | 251/96 |
| 3,210,040 | 10/1965 | Thurlow | 251/96 |
| 3,220,695 | 11/1965 | Downey et al. | 251/230 |
| 3,333,815 | 8/1967 | Downey et al. | 251/230 |
| 3,428,295 | 2/1969 | Downey et al. | 251/263 |
| 4,116,216 | 9/1978 | Rosenberg | 251/230 |
| 4,221,238 | 9/1980 | Madsen | 251/230 |
| 4,344,457 | 8/1982 | Caroli | 251/230 |
| 4,456,222 | 6/1984 | Shen | 251/339 |
| 4,771,985 | 9/1988 | Gross et al. | 251/230 |

Primary Examiner—George L. Walton
Attorney, Agent, or Firm—Bacon & Thomas

[57] ABSTRACT

A touch button controlled water stop mainly consists of an outer sleeve, a shaft rod, an upper toothed ring, a lower toothed ring, a spring guide bush, two springs, and a plunger; the shaft rod extending through a spring, a washer, a packing sheet, and a bushing ring and subsequently passing through the hollow cylindrical outer sleeve having a shaft support formed therein, the upper toothed ring, the lower toothed ring, the spring guide bush, and another spring and ending with the plunger secured thereon by a screw. The top end of the shaft rod can be linked with a touch button actuating means and the outer sleeve can be accommodated in a rear connector so that depressing the touch button will move the upper toothed ring to engage with the lower toothed ring. Further, raised blocks formed on the outer sleeve's inner wall confines the slide motion of the upper toothed ring and the lower toothed ring in such a way that the shaft rod will in turn dwell at two positions for each depressing. And thus the shaft rod can drive a plunger to open and close a water inlet, controlling water flow in a pipe.

5 Claims, 7 Drawing Sheets

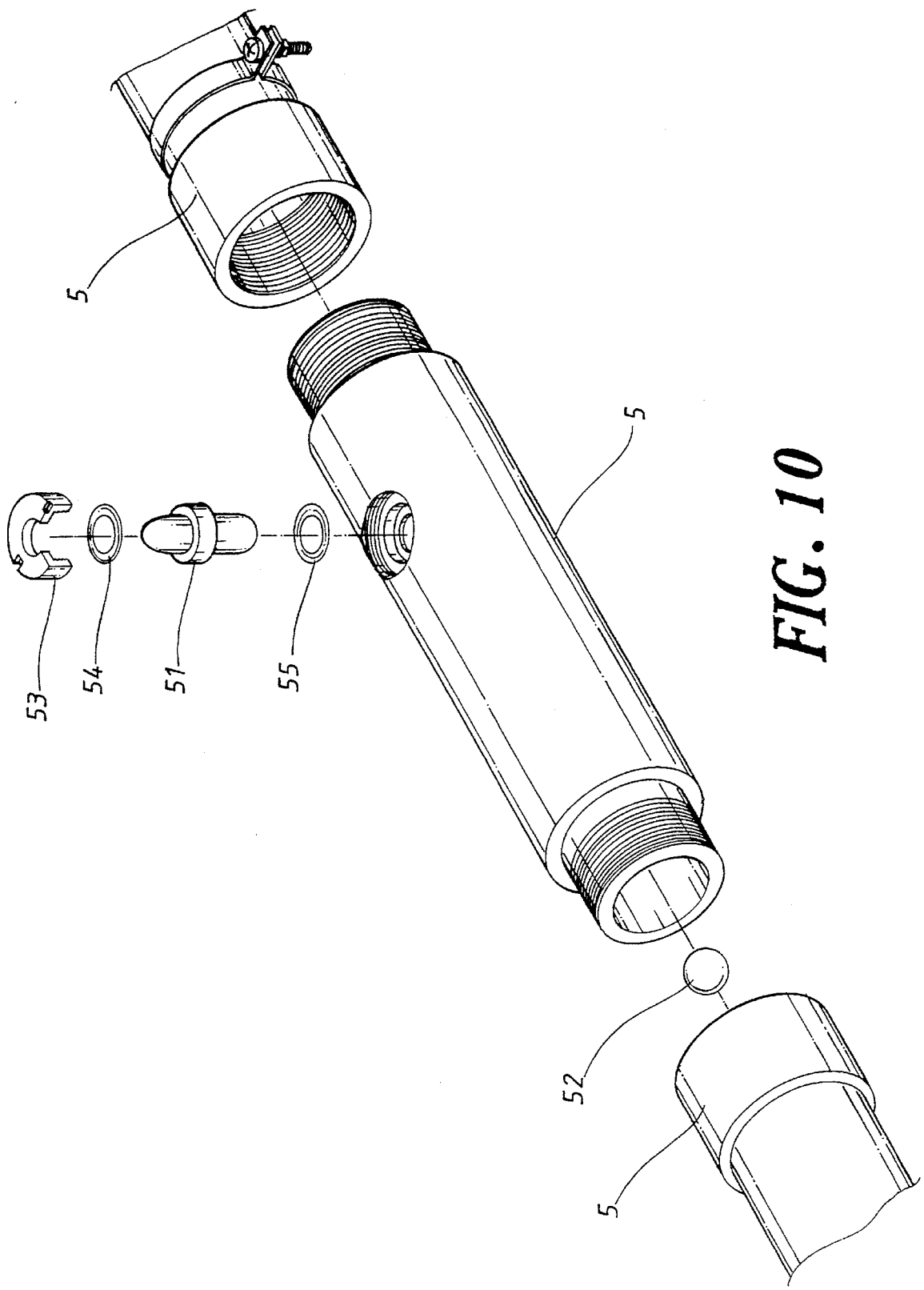

5,456,448

TOUCH BUTTON CONTROLLED WATER STOP

BACKGROUND OF THE INVENTION

1. Field of the Invention

This invention relates to a touch button controlled water stop, more particularly, to a water stop in which a shaft rod, when depressed, is driven to stop at two positions so that a plunger seated in front of a water orifice will be urged to open and close the water orifice and which can be used in a shower head, a faucet, and a water pipe to control water flow.

2. Description of the Prior Art

As an example of a conventional water supply apparatus, a prior art shower head can only allow water passing through and spreading out to let water distributed over a larger area for the convenience of washing. However, the job of controlling a water flow is left for the faucet; a prior art shower head can do nothing on it. And thus a prior art shower head has the following shortcomings.

1. People have to bend down to turn the faucet if they want to adjust water temperatures or to discontinue water flow while taking a bath. It is inconvenient in use.
2. When washing is finished or when people want to interrupt temporarily water flows, the outflow before they bend down and turn off the faucet is a waste.
3. In a prior art shower head's structure, the adjustment of water temperatures is not such an easy and simple thing. People have to separately turn off the cold and the hot water faucets when they want to discontinue water flows and must re-adjust water temperatures when the demand for hot water gets back. It is also inconvenient for users.

In view of the above-mentioned shortcomings, the inventor has been working hard to figure out a solution in which these problems have been eliminated.

SUMMARY OF THE INVENTION

The primary object of this invention is to provide a touch button controlled water stop which can be installed inside a shower head to provide a control means that governs the water flow in a shower head by depressing a button from the outside, instead of the conventional means that employs faucets to control the water flow in a shower head.

Another object of the invention is to provide a touch button controlled water stop which can be installed inside a faucet and which can govern the water flow in the faucet by pressing down a button from the outside, substituting for the conventional means in which the water flow in the faucet can only be controlled by turning on or turning off the faucet.

Another object of the invention is to provide a touch button controlled water stop which can be installed inside a water pipe to control the water flow in the pipe by pressing down an external button, substituting for the conventional means that employs a faucet to control the water flow in a pipe.

To obtain foregoing objects, the water stop of this invention mainly comprises an outer sleeve having a hollow shaft support; a shaft rod extending into a spring, a washer, a packing sheet, and a bushing ring, then passing through the outer sleeve, and then getting through in sequential an upper toothed ring, a lower toothed ring, a spring guide bush, and another spring; a plunger attached to the end of the shaft rod by a screw. When the shaft rod is pressed down, the engagement among the upper toothed ring, the lower toothed ring, and the outer sleeve urges the shaft rod to halt in turn at two positions and so the plunger driven by the shaft rod will in turn close and open a water orifice, completing water flow control.

The detailed structure, features, and other advantages of this invention will become apparent from the following detailed description of a preferred embodiment when read with reference to the accompanying drawings.

BRIEF DESCRIPTION OF THE DRAWINGS

FIG. 10 is a perspective exploded view showing parts of a water stop of the invention used in a water pipe.

DESCRIPTION OF A PREFERRED EMBODIMENT

Figure 1:
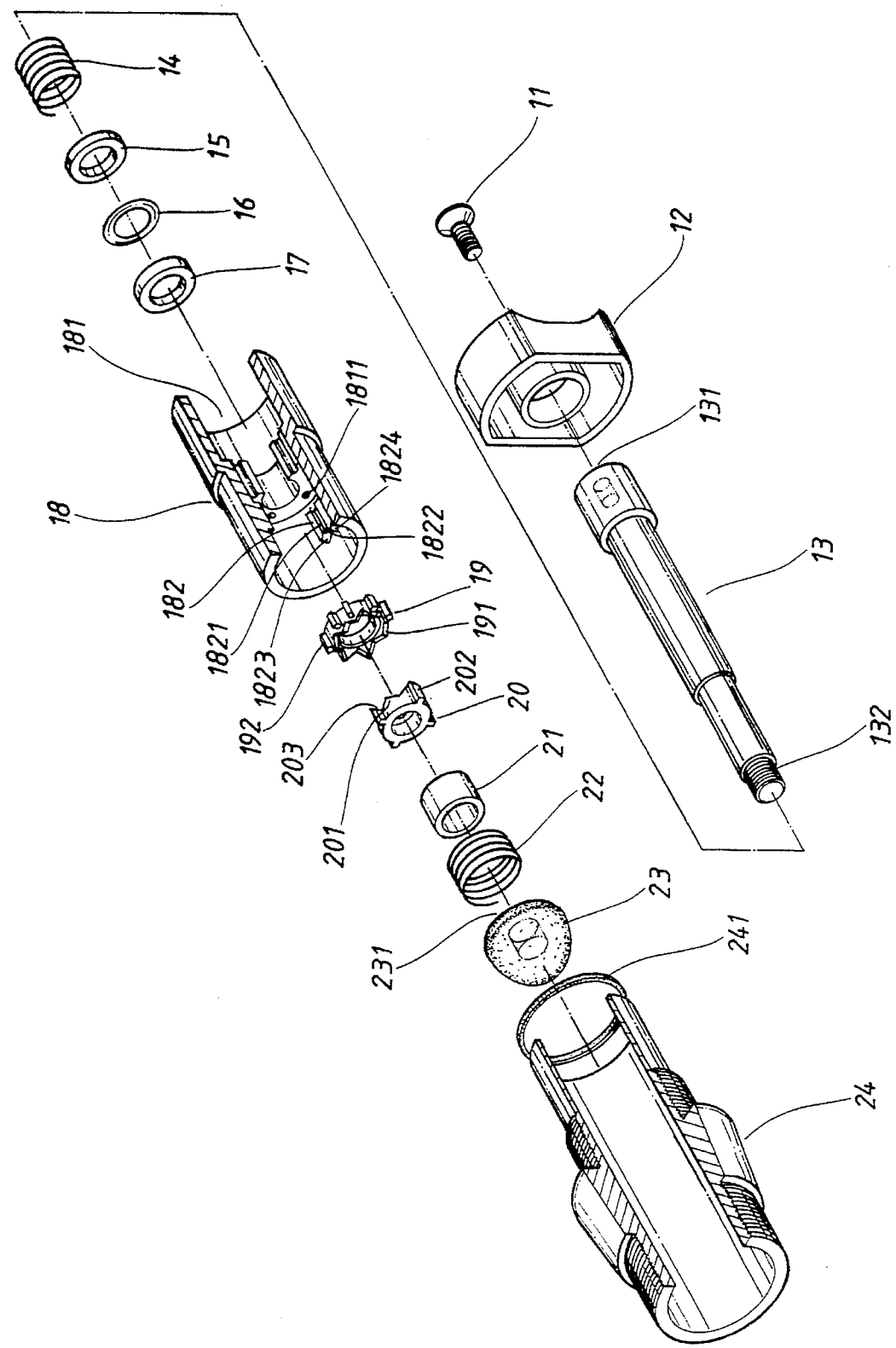
FIG. 1 is an exploded view showing an embodiment of a water stop according to this invention.

FIG. 1 is an exploded view of an embodiment of a touch button controlled water stop according to the invention. Referring to FIG. 1, the water stop of the invention chiefly comprises a shaft rod 13, an outer sleeve 18, an upper toothed ring 19, a lower toothed ring 20, a spring 22, and a plunger 23. The outer sleeve 18 has a plurality of dual raised blocks 182 disposed on its interior wall surface. The dual raised block has a flat top with a groove 1821 formed thereon. At the end of the groove 1821 is a retaining portion 1822. A shaft support 181 abuts the dual raised block 182. The shaft rod 13 is a multiple stepped cylindrical rod with a threaded hole 131 provided on its larger end and a threaded rod portion 132 on its smaller end. The upper toothed ring 19 has face teeth 191 disposed on an end face and extending backward, and transverse raised blocks 192 located on the outer wall surface thereof. The lower toothed ring 20 is configurated to have face teeth 201 disposed on one end and around the periphery thereof and extending forward. The transverse raised blocks 202 are distributed on the outer wall of face teeth 201 and have a slant end surface 203. A threaded hole is provided on the central portion of the plunger 23. The shaft rod 13 extends into a spring 14, a washer 15, a packing sheet 16, and a bushing ring 17; then passes through the shaft support 181 of the sleeve 18; and then get through in sequence the upper toothed ring 19, the lower toothed ring 20, the spring guide bush 21, and the spring 22. The threaded rod portion 132 of the shaft rod 13 is screwed into the threaded hole 231 of the plunger 23, with two ends of the spring 22 respectively pressing against the lower toothed ring 20 and the plunger 23 to drive the face teeth 191 of the upper toothed ring 19 to engage with the face teeth 201 of the lower toothed ring 20 meanwhile the transverse raised block 192 protrudes into the groove 1821 formed on the dual raised blocks 182. In the construction, a touch button 12 may be fastened on the top end of the shaft rod 13 by a screw 11.

Figure 5:
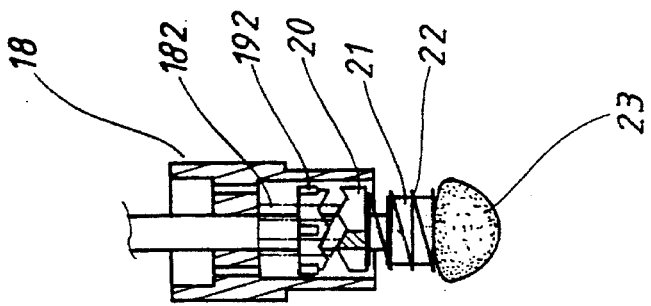
FIGS. 2 to 5 illustrate the movements of an upper and a lower toothed ring in an outer sleeve of a water stop according to this invention during four consecutive stages.
Figure 4:
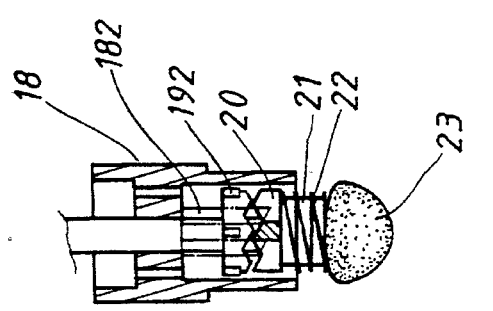
Figure 3:
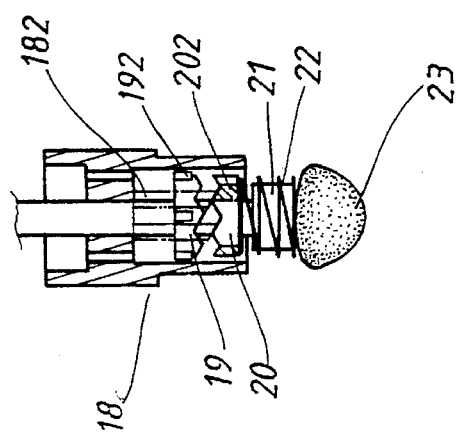
Figure 2:
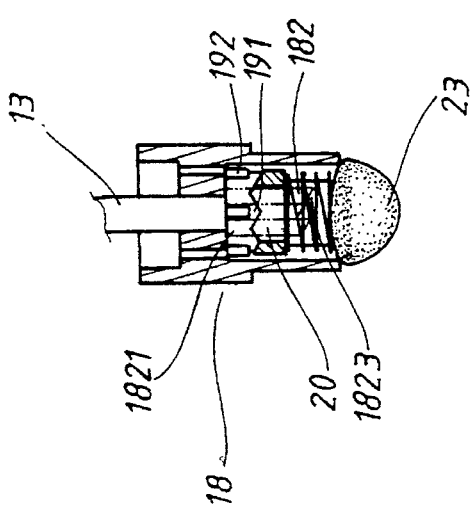

Now referring to FIGS. 2 to 5, FIG. 2 shows an initial state of an assembled water stop according to the invention, in which state the transverse raised blocks 202 of the lower toothed ring 20 are right in the groove 1821 on the dual raised blocks 182 while the face teeth 191 of the upper toothed ring 19 is partially engaging with the face teeth 201 of the lower toothed ring 20. When the shaft rod 13 is depressed, the face teeth 191 move the face teeth 201 to lower the lower toothed ring 20. On the other hand, the transverse raised block 192 slides down along the groove 1821 to guide the downward motion of the upper toothed ring 19. When the transverse raised block 202 arrives at the end of the dual raised blocks 182 and drops out of the groove 1821, the face teeth 191 of the upper toothed ring 19 force the face teeth 201 of the lower toothed ring 20 by the slant engaged surfaces to slide aside so that the transverse raised block 202 rides on a long slant surface 1823 of the dual raised block 182. At this time, the face teeth 201 and 191 are in a completely engaged state as shown in FIG. 3. As the external force acting on the shaft rod 13 is being removed, the shaft rod 13 is biased by the spring 14 and moves upwards. At the same time, the spring 22 urges the lower toothed ring 20 to move upwards the upper toothed ring 19 and the transverse raised block automatically slides onto the retaining portion 1822 from the long slant surface 1823 as shown in FIG. 4. When the shaft rod 13 is depressed once again, the face teeth 191 and 201 are still in contact with each other in a partially engaged state. When the transverse raised block 202 is driven to descend, the face teeth 191 and 201 are still in a partially engaged state until the transverse raised block 202 has escaped from the retaining portion 1822. At that time, the face teeth 201 of the lower toothed ring 20 is driven once again by the slant surface of the face teeth 191 of the upper toothed ring 19 to start sliding onto the short slant surface 1824 and the face teeth 201 and 191 come to a completely engaged state again as shown in FIG. 5. When the force exerted on the upper toothed ring 19 disappears, the face teeth 20 gets out of the short slant surface 1824 and restores to the initial state.

Figure 6:
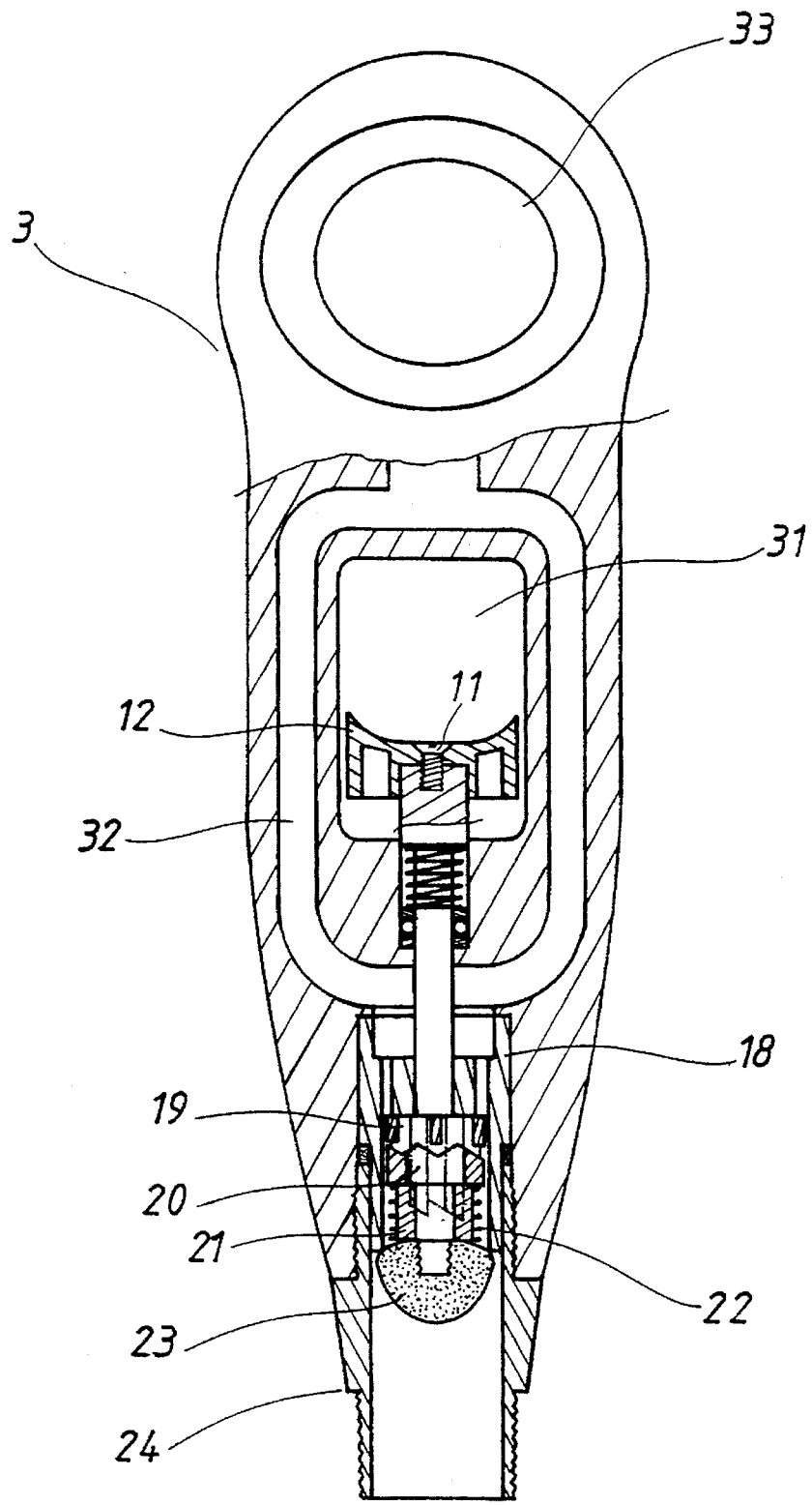
FIG. 6 is a schematic view showing a shower head using a water stop of this invention as its flow control means.

FIG. 6 is a schematic view showing an application of a water stop of this invention in a shower head. As can be seen from it, the water stop 1 of this invention is installed near the rear end of a shower head 3. There is a connector 24 attached to the rear end of the shower head 3. There is a hollow compartment 31 inside the shower head 3, which compartment provides room for the end portion of the shaft rod 13 of the water stop 1 and a touch button 12 secured on the rod end. The water channel 32 of the shower head 3 is connected to the sleeve 18 of the water stop of the invention and divided into two opposite ways which meet at a point behind the compartment 31 and then reach a water outlet.

Figure 7:
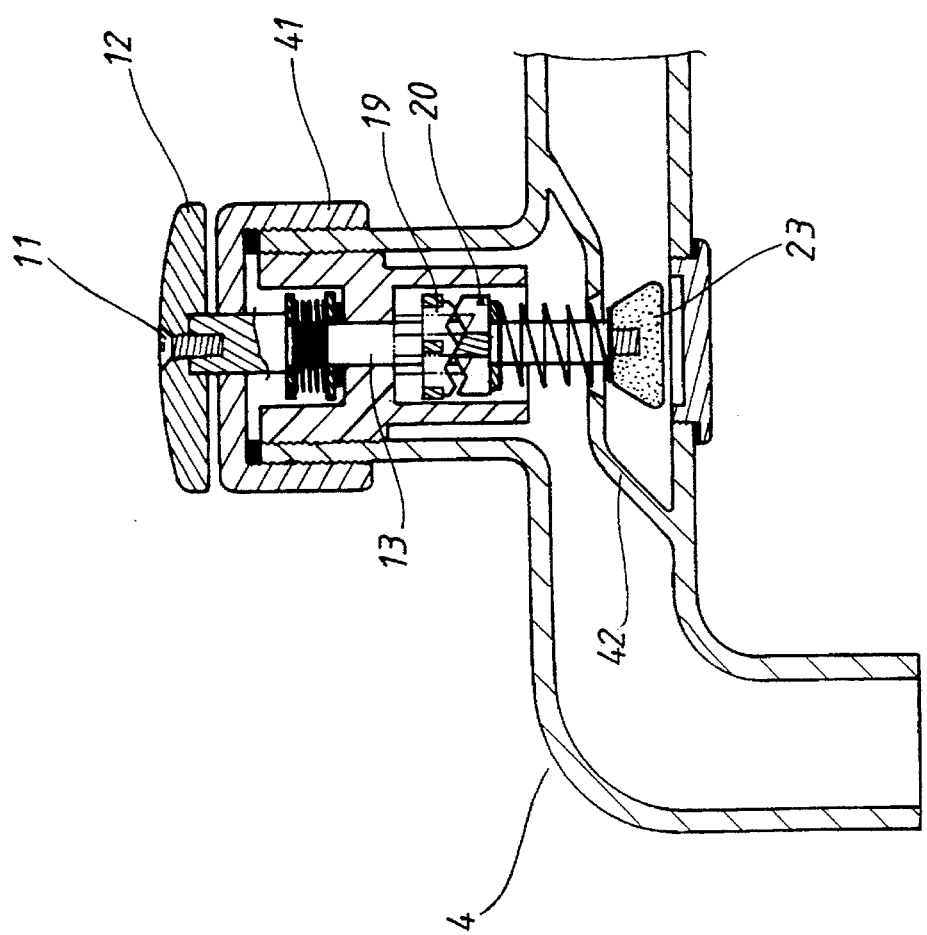
FIG. 7 is an elevation view showing a faucet in an open state, which faucet uses a water stop of the invention as its flow control means.
Figure 8:
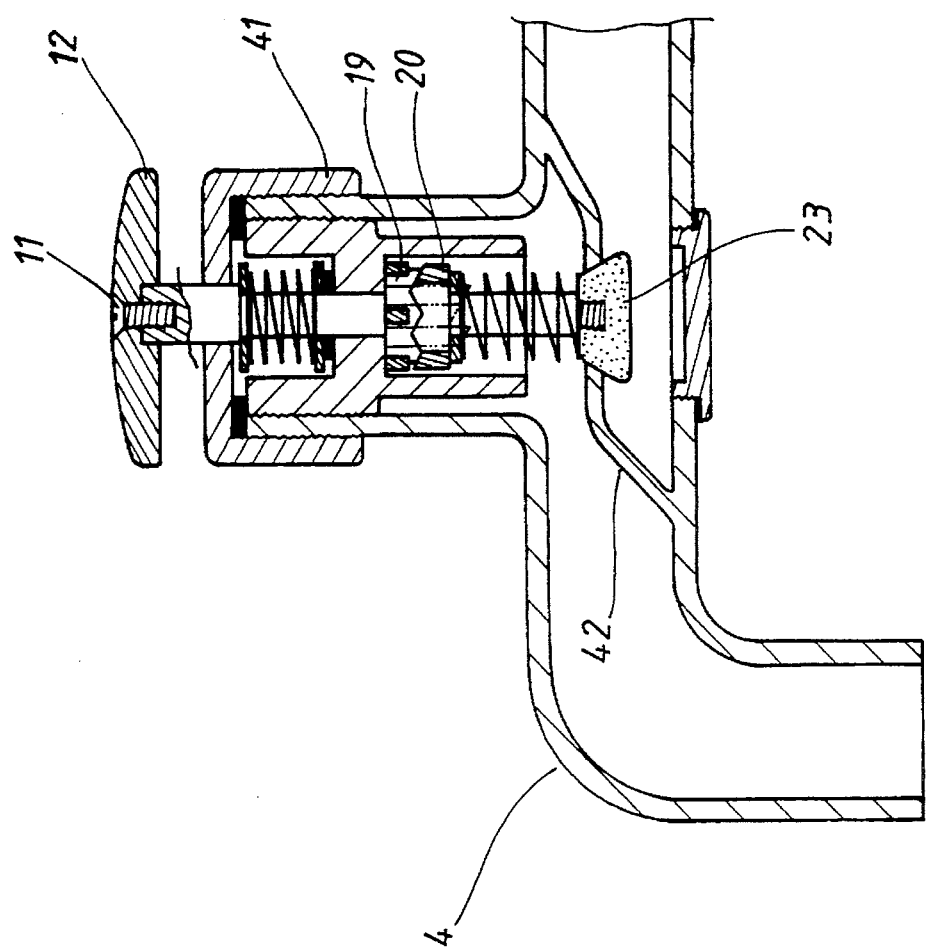
FIG. 8 is another elevation view showing a faucet in a close state, which faucet uses a water stop of the invention as its flow control means.

FIGS. 7 and 8 are schematic views showing the opening and the closing of a plunger in a faucet using a water stop of the invention. In this case the water stop 1 according to the invention is joined to the top of a faucet 4 by a cap 41. As indicated in FIG. 7, the spring 14 is in a compressed state when a touch button 12 is pressed down and the transverse raised blocks 202 of the lower toothed ring 20 leans on the retaining portion 1822 of the dual raised block 182 of the sleeve 18, keeping the shaft rod 13 in a protruding posture. At that time, the plunger 23 seated on the end of the shaft rod 13 stays in a position away from the pipe wall 42 of the faucet 4 and gives way to the passage of a water flow. The faucet 4 is in a open state. To stop a water flow, just depress the touch button 12 once again and the upper toothed ring 19 will move the face teeth 201 of the lower toothed ring 20 out of the retaining portion 1822. As a consequence, the spring 14 exerts a resilient force on the plunger 23 to urge the latter firmly cling to the pipe wall 42. And thus the faucet 4 restores to a closed state as shown in FIG. 8.

Figure 9:
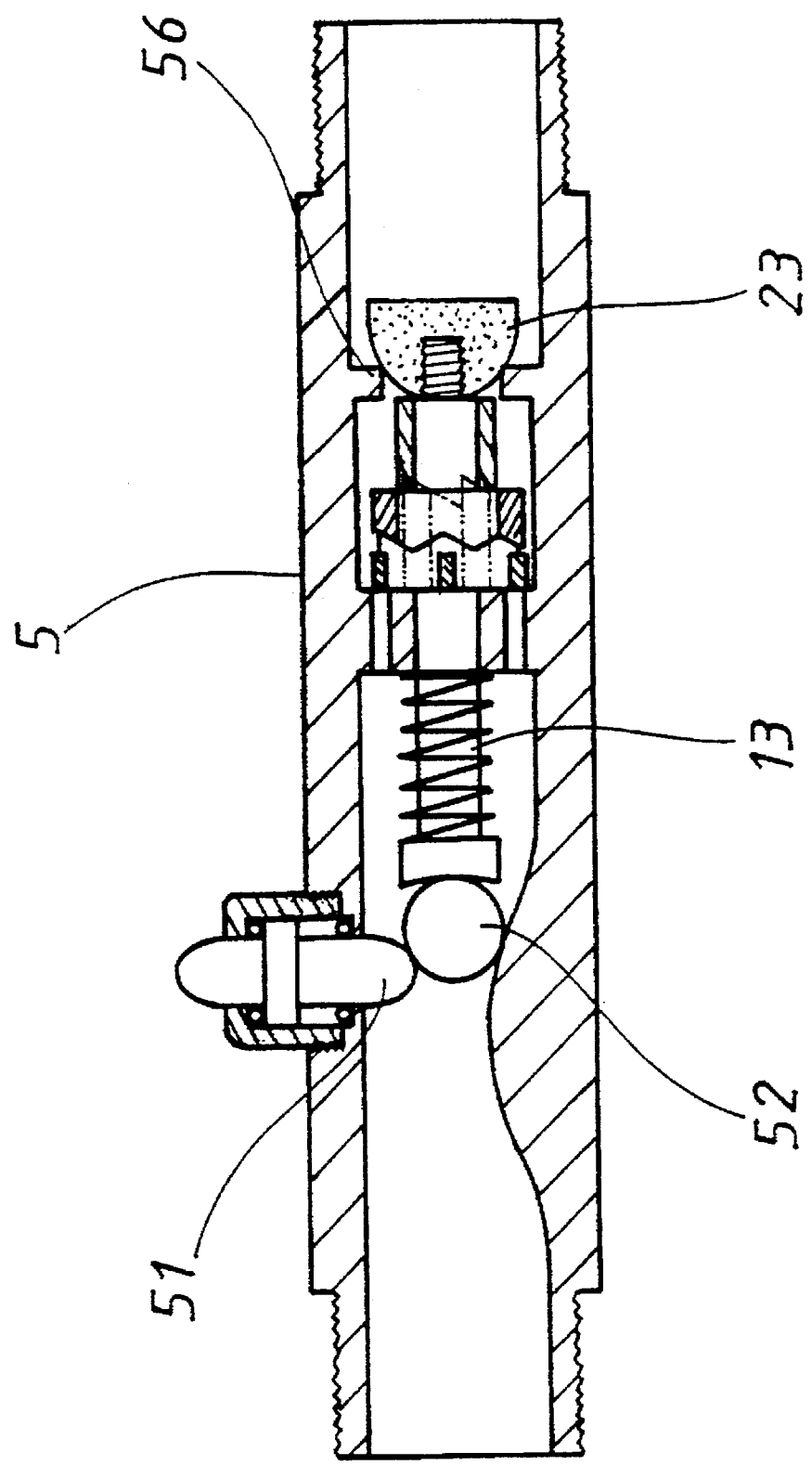
FIG. 9 is a cross sectional view showing a water pipe using a water stop of the invention as its flow control means.

FIGS. 9 and 10 show an exemplary application of a water stop of the invention in a pipe. As indicated in FIG. 9, a water stop 1 of this invention is transversely installed in a water pipe having formed on the interior wall thereof a flange 56 which, in conjunction with a plunger 23 abutting against the flange, blockades water flows. Arranged on the outer surface of the pipe wall is an actuating mechanism composed of a cap 53, a bushing ring 54, and a washer 55. The front end of the shaft rod 13 extends to a steel ball 52, which is constantly kept in touch with a pin 51. When the pin 51 is pressed down, the steel ball 52 is activated to drive the shaft rod 13, the upper toothed ring 19, and the lower toothed ring 20 to slide in the outer sleeve 18. By the same principles as described previously, the engagement among the shaft rod, the upper toothed ring, and the lower toothed ring makes the shaft rod 13 alternately dwell at two positions, which in turn drives the plunger 23 to leave or approach the flange 56, forming an open or close state of the pipe. In this way users can gain control of a pipe flow. In addition, the pipe 5 can also be connected to other water pipes to form a long conduit as shown in FIG. 10.

Briefly, the present invention has the benefits of simple construction, ease-for-use, and saving water consumption. It is indeed a new and useful invention.

What is claimed is:

1. A touch button controlled fluid valve actuating mechanism for actuating a plunger relative to a fluid opening between open and closed positions, comprising:

a) an outer sleeve having a shaft support and a plurality of dual raised blocks each having longitudinal groove therein and a retaining portion on an end thereof;

b) a shaft rod slidably located in the outer sleeve and extending though the shaft support so as to be movable between first and second positions, the shaft rod having first and second ends;

c) a touch button acting on the first end of the shaft rod;

d) a plunger attached to the second end of the shaft rod;

e) an upper toothed ring positioned on the shaft rod and located within the outer sleeve, the upper toothed ring having a plurality of first face teeth and a plurality of first raised blocks slidably engaging the plurality of longitudinal grooves of the dual raised blocks such that the upper toothed ring is slidable, but not rotatable with respect to the outer sleeve;

f) a lower toothed ring positioned on the shaft rod and located within the outer sleeve, the lower toothed ring having a plurality of second face teeth configured to engage the plurality of first face teeth and a plurality of second raised blocks each having a slant end face; and, g) spring biasing means acting on the lower toothed ring to urge the lower toothed ring towards the upper toothed ring such that in the first shaft rod position the second face teeth are in partial engagement with the first face teeth and the second raised blocks are slidably engaged within the longitudinal grooves thereby holding the plunger in a first position, and in the second shaft rod position the second raised blocks are out of engagement with the longitudinal grooves whereby the engagement between the first and second face teeth causes the lower toothed ring to rotate such that the slant end faces contact the retaining portion to hold the plunger in a second position until additional shaft rod movement is exerted to cause the second raised blocks to be in alignment with and movable within the grooves of the dual raised blocks to actuate the plunger to the first position.

2. A touched button controlled actuating mechanism as claimed in claim 1, wherein said shaft support has a plurality of fluid holes disposed around a periphery thereof.

3. The touch button controlled actuating mechanism of claim 1 further comprising means to attach the touch button to the first end of the shaft rod.

4. The touch button controlled actuating mechanism, of claim 1 further comprising a ball element in contact with the first end of the shaft rod and the touch button.

5. The touch button controlled actuating mechanism, of claim 4 wherein the touch button comprises a movable pin.

* * * * *